US008761813B2

(12) United States Patent
Gao

(10) Patent No.: US 8,761,813 B2
(45) Date of Patent: Jun. 24, 2014

(54) FAST SIGNALING SERVICES FOR E-UTRAN BASED WIRELESS SYSTEMS

(75) Inventor: Mingshen Gao, Batavia, IL (US)

(73) Assignee: Alcatel Lucent, Paris (FR)

( * ) Notice: Subject to any disclaimer, the term of this patent is extended or adjusted under 35 U.S.C. 154(b) by 1054 days.

(21) Appl. No.: 12/292,843

(22) Filed: Nov. 26, 2008

(65) Prior Publication Data

US 2010/0128646 A1    May 27, 2010

(51) Int. Cl.
*H04W 68/00*    (2009.01)

(52) U.S. Cl.
USPC ..... 455/458; 455/403; 455/422.1; 455/550.1; 370/310; 370/312; 380/270; 380/271

(58) Field of Classification Search
USPC ............ 370/29–338, 355–563; 455/436–449, 455/67.11–67.7, 458–460, 525; 340/286.01, 286.02, 7.29
See application file for complete search history.

(56) References Cited

U.S. PATENT DOCUMENTS

| | | | |
|---|---|---|---|
| 2004/0142706 A1* | 7/2004 | Kim et al. | 455/458 |
| 2004/0156330 A1* | 8/2004 | Yi et al. | 370/328 |
| 2004/0266440 A1* | 12/2004 | Fuchs et al. | 455/445 |
| 2008/0045224 A1* | 2/2008 | Lu et al. | 455/446 |
| 2008/0101270 A1* | 5/2008 | Kekki et al. | 370/312 |
| 2008/0233974 A1* | 9/2008 | Xu | 455/458 |
| 2008/0311949 A1* | 12/2008 | Koskinen et al. | 455/525 |
| 2010/0075678 A1* | 3/2010 | Akman et al. | 455/436 |
| 2010/0081459 A1* | 4/2010 | Bosch et al. | 455/458 |
| 2010/0232340 A1* | 9/2010 | Godor et al. | 370/312 |

FOREIGN PATENT DOCUMENTS

| | | |
|---|---|---|
| WO | WO 2008/041928 | 9/2007 |
| WO | WO 2008095523 A1 * | 8/2008 |

OTHER PUBLICATIONS

3GPP TS 23.401 V8.3.0 (Sep. 2008) "3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 8)".
3GPP TS 36.300 V8.6.0 (Sep. 2008) "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)".
ETSI TS 125 346 V6.8.0 (Jun. 2006) Universal Mobile Telecommunications System (UMTS); Introduction of the Multimedia Broadcast/Multicast Service (MBMS) in the Radio Access Network (RAN); Stage 2 (3GPP TS 25.346 version 6.8.0 Release 6).

* cited by examiner

*Primary Examiner* — Steven Lim
*Assistant Examiner* — Sisay Yacob
(74) *Attorney, Agent, or Firm* — Harness, Dickey & Pierce P.L.C.

(57) ABSTRACT

Fast Signaling Services (FSS) for E-UTRAN based wireless systems are provided. A mobility management entity defines FSS MBSFN areas for its tracking areas and generates a FSS packet including signaling information intended for a plurality of UEs in a tracking area of the wireless network. The tracking area and its associated FSS MBSFN area includes a plurality of cells/eNodeBs. The mobility management entity multicasts the generated packet to the plurality of cells/eNodeBs in the FSS MBSFN area that covers the tracking area. The plurality of eNodeBs broadcast the packaged signaling messages to the plurality of UEs in the tracking area using the FSS MBSFN transmission. The FSS improves signaling performance of the overall system for the E-UTRAN.

18 Claims, 6 Drawing Sheets

FAST SIGNALING SERVICES FOR E-UTRAN BASED WIRELESS SYSTEMS

BACKGROUND

Long Term Evolution (LTE) is the name given to a project to improve the Universal Mobile Telecommunications System (UMTS) standard to cope with future requirements. In one aspect, UMTS has been modified to provide for the Evolved Universal Terrestrial Radio Access Network (E-UTRAN) as a fourth generation (4G) wireless network.

An E-UTRAN includes eNodeBs, which provide the Evolved Universal Terrestrial Radio Access (E-UTRA) user plane (PDCP/RLC/MAC/PHY) and control plane (RRC) protocol terminations with a user equipment (UE). The eNodeBs are interconnected with each other by an X2 interface. The eNodeBs are also connected to a Mobility Management Entity (MME) via an S1-MME interface, and to a Serving Gateway (S-GW) via an S1-U interface.

Within an E-UTRAN, Multimedia Broadcast Multicast Service (MBMS) is a multicast (point-to-multipoint) service in which multimedia content (e.g., voice, audio, video, etc.) is transmitted from an MBMS gateway (MBMS GW) to multiple eNodeBs and then to multiple UEs with the help of a Multi-cell/Multicast Coordination Unit (MCE). Broadcast/multicast transmitting of the same content to multiple UEs using a relatively small amount of network resources (rather than using multiple network resources for the same content) reduces system resource utilization, which improves overall system performance because the conserved network resources may be used for other traffic.

FIG. 1 shows a portion of a conventional E-UTRAN deployment including an E-UTRAN access gateway 100 in communication with a plurality of eNodeBs 105. The E-UTRAN in FIG. 1 provides MBMS to UEs within the E-UTRAN. As discussed herein, eNodeB refers to a base station that provides radio access to UEs within a given coverage area. This coverage area is referred to as a cell. However, as is well-known, multiple cells are often associated with a single eNodeB.

The E-UTRAN access gateway 100 includes an MBMS Multi-cell Coordination Unit or Entity (MCE) 110 and an MBMS GW 112. The MBMS MCE 110 is a logical entity that controls the eNodeBs 105 and coordinates multi-cell scheduling and transmission for eNodeBs 105 belonging to the same Multimedia Broadcast Single Frequency Network (MBSFN) area, which will be discussed in more detail later. In more detail, functions of MBMS MCE 110 include scheduling and timing control, eNodeB registration and feedback. The MBMS GW 112 is a logical entity that multicasts MBMS packets to each eNodeB providing the MBMS.

As is well-known, an MBSFN area is comprised of a group of cells that form a MBSFN Synchronization Area of a network. In the MBSFN Synchronization Area, the group of cells are synchronized and coordinated to perform MBSFN transmissions. An MBSFN transmission is a simulcast transmission technique in which identical waveforms are transmitted from multiple cells at the same time. A MBSFN transmission from multiple cells within the MBSFN area is seen as a single transmission by a UE, where the UE automatically combines the E-UTRAN's orthogonal frequency division multiplexed (OFDM) signals from multiple adjacent cells to improve reception resulting from improvements in signal to noise ratio (SNR).

The E-UTRAN access gateway 100 further includes a mobility management entity (MME) 140 in two-way communication with the eNodeBs 105. As described in 3GPP TS 36.300 V.8.6.0, the entire contents of which is incorporated herein by reference, the MME 140 controls, inter alia, user radio access network (RAN) mobility management procedures and user session management procedures.

For example, the MME 140 controls a UEs tracking and reachability. The MME 140 also controls and executes transmission and/or retransmission of signaling messages such as paging messages for notifying destination UEs of impending connection requests (e.g., when UEs are being called or when network initiated data intended for the UE is coming).

In performing its mobility management functions, the MME 140 stores a tracking area (TA) or list of tracking areas for each UE when the UEs are in the RRC_IDLE mode. The TA includes a plurality of cells located in close proximity to one another and indicates the area in which the UE is located. This location information is refreshed through a "location update" message (e.g., the Tracking Area Update (TAU) Message defined in 3GPP TS 36.300 V.8.6.0) sent by the UE either periodically or when the UE's tracking area changes.

When the MME 140 is notified of a connection request for a UE, the MME 140 sends a paging message to each eNodeB within the UE's tracking area. These paging signaling messages, which are part of the S1-AP layer in the protocol stack, are passed from MME 140 to each eNodeB in the UE's tracking area over a separate, point-to-point S1-MME interface. As a result, identical messages are sent over multiple point-to-point links to each eNodeB in the UE's tracking area.

In response to receiving the paging messages, the eNodeBs broadcast the paging messages on a slower signaling control channel such as the Paging Control Channel (PCCH) or Broadcast Control Channel (BCCH). These control channels broadcast the signaling messages to the entire coverage area of the cell. Conventionally, the slower signaling control channels are used because the data rate is limited for UEs near edges of cells due to their distance, inter-cell interference, as well as the use of lower code rate and lower level of modulation (e.g., quadrature phase shift keying (QPSK)).

As is well-known, the air interface resources are critical resources for a service provider. When a plurality of cells are used for transmitting the same content at a slow data rate, significant amounts of the air interface resources are wasted. This slow and costly signaling procedure is a potential weakness for any wireless network.

In most cases, especially during busy hours, many UEs in the same tracking area may need to be notified of connection requests at about the same time. As a result, the unicast signaling (in which identical messages are sent over separate, multiple point-to-point links) occurs many times (once for each UE) within a small time period depending on the typical discontinuous reception (DRX) cycles for UEs. When this occurs, similar packets are repeated at an unnecessarily high rate across connections for various network entities (e.g., MME to each of a plurality of eNodeBs). The service provider normally bears the burden of this consumption of network resources.

The transmission of these identical signaling messages to UEs over the air interface at slower data rate by all cells in a tracking area also wastes critical system resources and results in some degradation due to over-usage of system resources for the signaling messages that do not contribute to revenue generation.

Moreover, it is well-known that UEs may experience a 'ping-pong' effect near boundaries between tracking areas because the UEs capable of registering with either one of the two adjacent tracking areas may toggle between the two due to dynamic changes in radio frequency (RF) conditions. This ping-pong effect consumes unnecessary resources because messages must be transmitted through the air interface and pass through the distributed network entities each time the UE toggles between the adjacent tracking areas.

Further, once a UE is notified of an incoming connection request (via a paging message), the UE and the radio access network (RAN) exchange messages to setup a connection with an evolved packet system (EPS) default bearer. The EPS default bearer is normally a best effort Internet Protocol (IP) connection. The actual IP services requested (e.g., for a voice call over IP) are communicated only after setting up the initial connection. The specific application(s) involved are then started and their associated dedicated EPS bearers with specific quality of service (QoS) are established. In this instance, some undesirable delay exists and impacts the wireless user's experience for both the calling user and the called user.

SUMMARY

Example embodiments provide for Fast Signaling Services (FSS) for an Evolved Universal Terrestrial Radio Access Network (E-UTRAN) as a fourth generation (4G) wireless network.

In one example embodiment, a method of communicating signaling messages in a wireless network is provided. A radio network equipment (e.g., mobility management entity) generates a multicast packet including signaling information (signaling messages) intended for a plurality of UEs in an area (e.g., a tracking area) of the wireless network. The area is a tracking area of the wireless network, which includes a plurality of eNodeBs and in which the plurality of UEs are located. The mobility management entity multicasts the multicast packet to the plurality of eNodeBs in the area for transmission to the plurality of UEs in the area via Internet Protocol (IP) multicast.

At least one radio network equipment transmits signaling messages to a user equipment (UE) via a multicast channel. The multicast channel is capable of providing multimedia content to a plurality of UEs in an area of the wireless network. The signaling messages include at least paging information for locating the UE within the area.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF THE EMBODIMENTS

Figure 1:
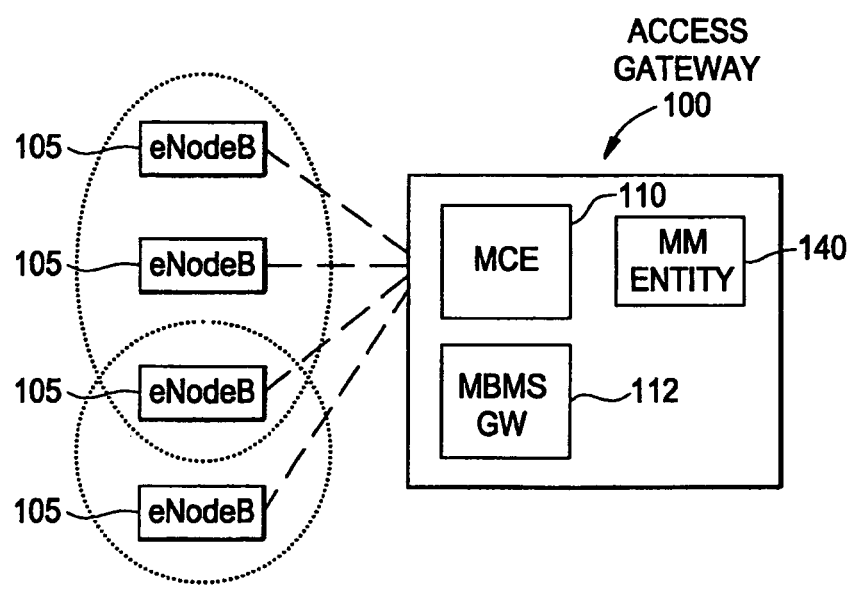
FIG. 1 shows a portion of a conventional E-UTRAN deployment.

Example embodiments will now be described more fully with reference to the accompanying drawings.

Various example embodiments of the present invention will now be described more fully with reference to the accompanying drawings in which some example embodiments of the invention are shown. In the drawings, the thicknesses of layers and regions are exaggerated for clarity.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As described herein, a user equipment (UE) describes a remote user of wireless resources in a wireless communication network and may be considered synonymous to, and may hereafter be occasionally referred to, as a terminal, mobile unit, mobile station, mobile user, access terminal (AT), subscriber, remote station, access terminal, receiver, etc. Further, as discussed herein, radio network equipment may be used to refer to network entities/equipment such as the Mobility Management Entity, the eNodeB, etc.

Example embodiments create a special Multimedia Broadcast Multicast Service (MBMS) for an Evolved Universal Terrestrial Radio Access Network (E-UTRAN). This service is referred to herein as the Fast Signaling Service (FSS). In this special MBMS, a plurality of Multimedia Broadcast over Single Frequency Network (MBSFN) areas are created, each of the plurality of MBSFN areas corresponding to a respective tracking area. The content to be transmitted for each MBSFN is not a typical multimedia flow; but rather packaged signaling messages that are to be sent to a plurality of UEs in the tracking area at a given time. Accordingly, the special MBMS differs from the conventional MBMS.

The FSS provides a mechanism in which signaling information (e.g., paging messages or other Non-Access Stratum (NAS) signaling messages) for a plurality of UEs are packaged together and multicasted in a single transmission to eNodeBs in a given tracking area. As compared to conventional methods for sending signaling messages on a per message and per eNodeB basis (which results in many unicast transmissions), FFS conserves relatively large amounts of network resources.

Further, for more critical air interface resources, rather than let every single cell in the tracking area transmit the signaling messages over control channels such as the Paging Control Channel (PCCH) carried by the Paging Channel (PCH) (which is a transport channel) at a relatively slow rate as is the case in the conventional art, the FSS allows the signaling messages to be transmitted over a Multicast Channel (MCH) capable of carrying relatively large multimedia content.

As is well-known, the BCH is a downlink transport channel supporting the broadcast control channel (BCCH) for broadcasting system control information and the PCH is a downlink transport channel supporting the paging control channel (PCCH) for broadcasting paging messages. System control information includes, for example, information valid for multiple cells such as public land mobile network (PLMN) identity, tracking area identity, information needed for cell search (e.g., cell identity), information needed for system/cell access (e.g., System Frame Number), and so on. According to example embodiments, the system access information transmitted on the BCCH indicates the location of the MCCHs. The MCCHs are used for the FSS MBMS service in this tracking area.

As is also well-known, the MCH is a transport channel including a traffic channel portion (the Multicast Traffic Channel (MTCH)), which conventionally carries MBMS content (e.g., multimedia data), and a control channel portion (the Multicast Control Channel (MCCH)), which conventionally carries control information associated with the MBMS content.

According to example embodiments, rather than allocating many PCH resources for carrying a plurality of paging messages for a plurality of UEs in the tracking area, a relatively small amount of radio resources allocated for a MCH is sufficient to carry similar or the same numbers of signaling messages. Therefore, service providers are able to reduce the use of critical system resources. Further, this new signaling mechanism may increase the system's overall signaling delivery performance, which may improve users' experience of the service provider's wireless network. This is because, when radio resources used for PCH reach a limit (e.g., due to more UEs being paged), many signaling messages must be deferred to a later time.

According to example embodiments, a Mobility Management Entity (MME) packages signaling messages (e.g., paging messages or other NAS signaling messages) for a plurality of UEs in a tracking area into a MBMS data packet. The MBMS data packet serves as FSS content for the FSS MBSFN area corresponding to (or covering) the tracking area. The MME transmits the data packet to the plurality of eNodeBs in the FSS MBSFN area. All cells in the FSS MBSFN area transmit the FSS content including signaling messages via their MCHs. An example FSS MBSFN area will be described in more detail below.

As discussed herein, the packaged signaling messages (or list of signaling messages) for a plurality of UEs to be transmitted using the FSS are referred to as FSS content or FSS information, the MBMS data packets including the FSS content are referred to as FSS packets, and the transmissions including the FSS packets are referred to as FSS MBSFN transmissions. According to example embodiments, transmission of FSS content to all cells in a tracking area are MBSFN transmissions. As discussed above, an MBSFN transmission is a simulcast transmission technique realized by transmitting identical waveforms at the same time from multiple cells within an MBSFN Area.

A MBSFN transmission from multiple eNodeBs within an MBSFN area is seen as a single transmission by a UE. The UE automatically combines the E-UTRAN's orthogonal frequency division multiplexed (OFDM) signals from multiple adjacent cells to improve reception due to the improved signal to noise ratio (SNR). Therefore, the data rate for transmitting the signaling messages is higher than the data rate achieved by a single cell transmission where signals from adjacent cells are effectively seen as noise.

As is well-known, a paging message is only part of NAS signaling. NAS signaling messages are upper layer messages for NAS services and functions such as EPS Bearer control, mobility handling, paging origination, configuration and control of security, etc. Methods according to example embodiments may be used to distribute paging and/or other NAS signaling messages to UEs in an FSS MBSFN area corresponding to a given tracking area. Due to the much improved capacity when using MCH as compared to using normal control channels, short messaging service (SMS) or other small data may be delivered to UEs by using the Data over Signaling technology.

Figure 2:
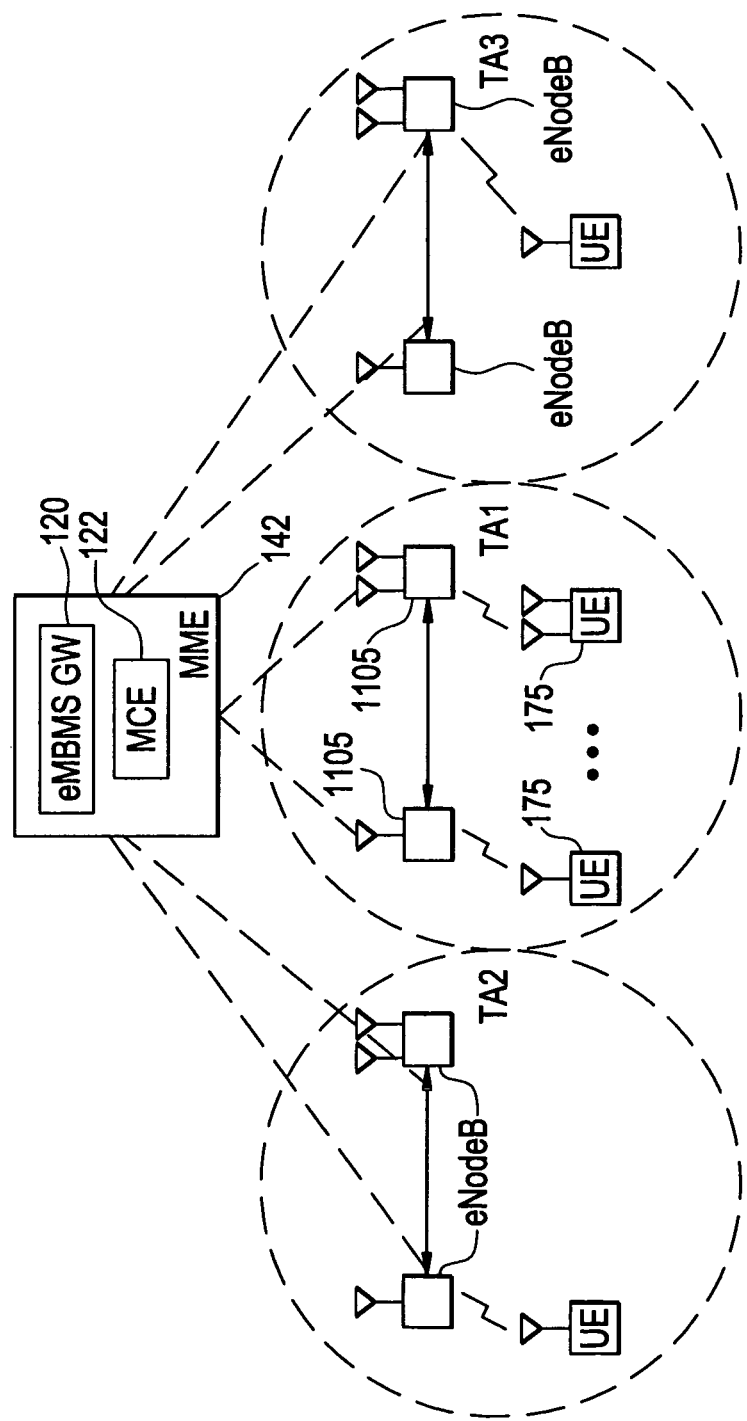
FIG. 2 illustrates a portion of an FSS MBSFN according to an example embodiment.

FIG. 2 illustrates a portion of a MBSFN for providing FSS to UEs located therein. The MBSFN shown in FIG. 2 is referred to herein as an FSS MBSFN.

Referring to FIG. 2, a MME coverage area may include a plurality of tracking areas TA1, TA2, TA3. Each tracking area may correspond (be covered by) a FSS MBSFN. Example embodiments will be discussed in connection with the FSS MBSFN corresponding to the tracking area TA1 shown in FIG. 2. However, it will be understood that example embodiments may be implemented and/or used in conjunction with other wireless systems such as those based on the third generation (3G) UMTS technology in which other network elements such as a radio network controller (RNC) or serving general packet radio service (GPRS) support node (SGSN) are used for mobility management.

Referring to FIG. 2, the tracking area TA1 includes a plurality of eNodeBs 1105 serving the plurality of UEs 175. Each of the eNodeBs 1105 functions in the same manner as the eNodeBs 105 described above with regard to FIG. 1.

The MME 142 is in two-way communication with each eNodeB 1105 and may function in a manner similar to that of the MME 140 described above with regard to FIG. 1. But, the MME 142 may further include an eMBMS GW standard logic entity or function unit (referred to herein as the MBMS GW module) 120 and an MCE standard logic entity or function unit (referred to herein as the MCE module) 122. That is, the MME 142 may function in accordance with the 3GPP standard 3GPP TS 36.300 v8.6.0 in addition to including the eMBMS GW module 120 and an MCE module 122, each of which perform the following functions.

The functions performed at the eMBMS GW module 120 and the MCE module 122 shown in FIG. 2 are analogous to the conventional functions performed by the conventional MBMS GW 112 and the MCE 110, respectively, for MBSFN transmission. However, the eMBMS GW module 120 and the MCE module 122 may be modules, units or entities within the MME 142 and perform the functions described below with respect to FSS MBSFN transmissions, rather than conventional MBMS transmissions. Although the eMBMS GW module 120 and the MCE 122 are shown as included at the MME 142, it will be understood that these network entities may be co-located at any network entity or distributed among multiple network entities in an E-UTRAN. For example, the actual multicasting of FSS content for a FSS MBSFN area from the MME 142 to the plurality of eNodeBs may be performed through the serving gateway (S-GW) network element, which is a standard entity for the 3GPP Long-Term Evolution/System Architecture Evolution (LTE/SAE) wireless network and which performs normal bearer traffic (including broadcasting or multicasting bearers).

In more detail, still referring to FIG. 2, the eMBMS GW 120 performs a simplified MBMS GW function. Namely, the eMBMS GW 120 sends or forwards FSS packets generated locally at the MME 142 to all eNodeBs 1105 within the FSS MBSFN area using Internet Protocol (IP) Multicast. Again, an FSS MBSFN area will be discussed in more detail below. Each eNodeB within the FSS MBSFN area may receive each generated FSS packet, which includes signaling messages/information for a plurality of UEs located in the FSS MBSFN area.

To generate FSS packets, the eMBMS GW 120 collects signaling messages to be sent to UEs in a tracking area. Assuming, for example, a UE in the RRC_IDLE mode wakes up every discontinuous reception (DRX) cycle (e.g., about 5 seconds), a paging message for the UE need only be sent at the time when the UE wakes up to receive signaling messages. Accordingly, the eMBMS GW 120 may collect signaling messages to be sent to UEs in a tracking area that are about to wake up before the next scheduled transmission time. The eMBMS GW 120 packages these collected signaling messages together as a payload for an FSS packet and formats the frame as specified by the MBMS standard, which is well-known in the art. Although the above mentioned example assumes that an idle UE wakes up every 5 seconds, as discussed in more detail later, the actual sleep (idle) time is determined by the discontinuous reception (DRX) configuration for the UE, which is often specified by the network.

The MCE 122 determines the radio configuration (e.g., modulation and coding schemes) and allocates radio resources (e.g., time/frequency resources) used by all cells in the FSS MBSFN area for multi-cell FSS MBSFN transmissions; that is, MBSFN transmissions including FSS content. According to example embodiments, the MCE 122 is used at initialization if a fixed radio configuration and a fixed MCH Sub-frame Allocation Pattern (MSAP) is used. In this case, dynamic allocation is not necessary. However, dynamic allocation may be used if desired.

Figure 3:
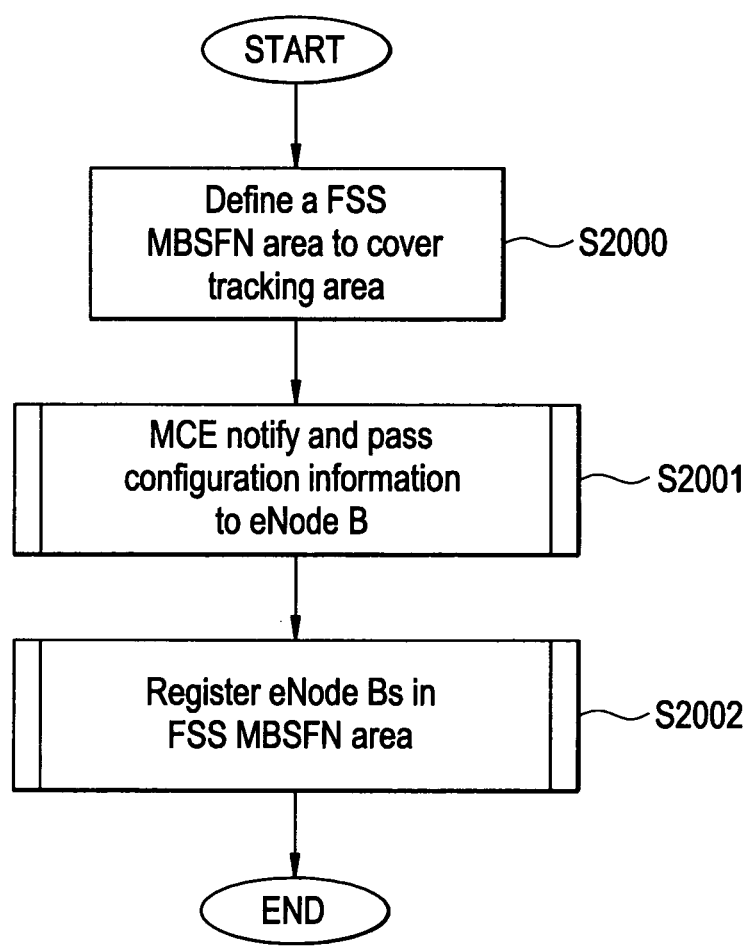
FIG. 3 is a flowchart illustrating a method for identifying an FSS MBSFN area according to an example embodiment.

FIG. 3 is a flowchart illustrating a method for setting up an FSS MBSFN area according to an example embodiment. The method shown in FIG. 3 may be performed at the MME 142.

Referring to FIG. 3, at step S2000, the MME 142 defines a FSS MBSFN area for each given tracking area (e.g., TA1, TA2, and TA3 in FIG. 2, although assigning more than one tracking area to a single FSS MBSFN area is also allowed according to example embodiments).

Figure 4:
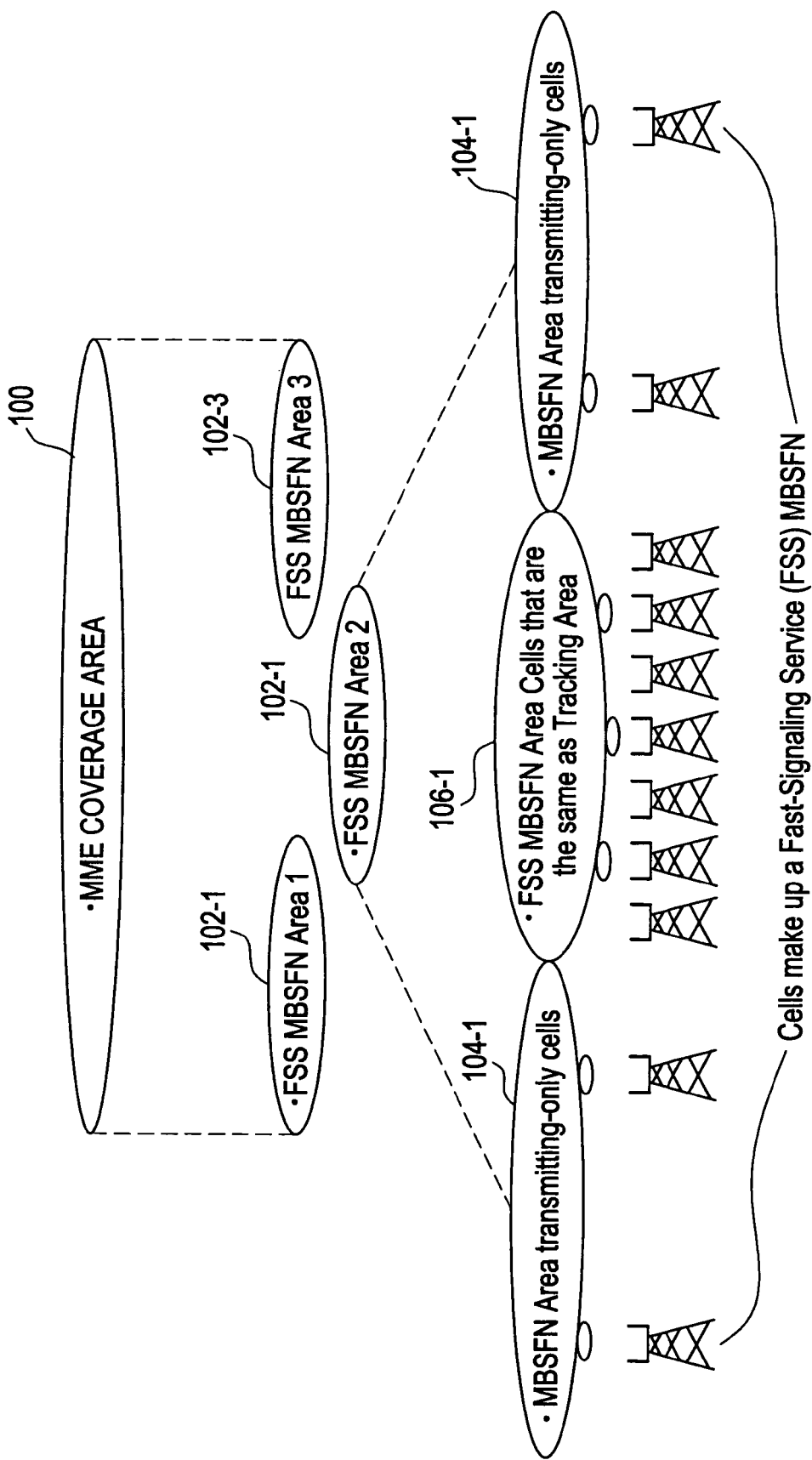
FIG. 4 illustrates an example FSS MBSFN area for a tracking area.

An example FSS MBSFN 102-2 area for a given tracking area is shown in FIG. 4. According to example embodiments, the FSS MBSFN area 102-2 is an MBSFN area in which FSS is provided.

As is the case with a conventional MBSFN area described in 3GPP TS 36.300 v8.6.0, the FSS MBSFN area 102-2 includes a group of eNodeBs that constitute a MBSFN Synchronization Area, which is part of the MME coverage area 100 of an E-UTRAN. The eNodeBs in the FSS MBSFN area 102-2 register and receive FSS content from the MME (e.g., MME 142 in FIG. 2) via IP multicast transmissions. These eNodeBs are coordinated to transmit the received FSS content, which may be a list of signaling messages from the MME 142, to the plurality of UEs (not shown in FIG. 4) in the FSS MBSFN area 102-2.

Still referring to FIG. 4, the MME coverage area 100 includes multiple FSS MBSFN areas 102-1, 102-2, and 102-3. An eNodeB within MME coverage area 100 may form part of multiple ones of the FSS MBSFN Areas 102-1, 102-2, and 102-3. Each of the FSS MBSFN areas may be characterized by different FSS content and participating set of eNodeBs. As noted above, a FSS MBSFN area may be associated with a tracking area or multiple tracking areas. A customized arrangement for FSS MBSFN areas for covering an entire MME coverage area is also supported because the FSS MBSFN areas do not have to correspond exactly with tracking areas.

Still referring to FIG. 4, for a given UE, the base part of the FSS MBSFN area 102-2 is essentially the same as a conventional tracking area 106-1 maintained by the MME 142 for managing a UE's mobility. In addition, the FSS MBSFN area 102-2 includes adjacent (bordering) "transmitting-only cells" 104-1. As defined in 3GPP TS 36.300 V8.6.0, a "transmitting-only cell" is a cell within a MBSFN area, which contributes to an MBSFN transmission, but does not advertise the availability of an MBSFN transmission within the cell.

In other words, the FSS MBSFN area 102-2 includes the tracking area 106-1 in which a UE is currently registered and tracking areas adjacent to the tracking area (e.g., transmitting only cells 104-1) in which the UE is registered.

According to example embodiments, the addition of the "transmitting-only cells" at the boundary of a FSS MBSFN area serves several purposes. For example, it improves reception of UEs at the boundaries of the tracking area so that a much higher data rate for sending signaling messages to these UEs over the air interface may be maintained. As a result, signaling messages may be sent to UEs quicker than the conventional slow data rate transmission over the control channels (e.g., the BCH and/or PCH). Example embodiments also help overcome limitations on a system's signaling capability because one sub-frame of radio resources may be used to carry more signaling messages.

Moreover, the addition of the "transmitting-only cells" at the boundary of a FSS MBSFN area helps to solve the 'ping-pong' effect by UEs at boundaries of the tracking area, which will be discussed in more detail below.

Further still, instant messaging (IM) and short messaging services (SMS) are getting more and more popular nowadays and they are the services that have dramatically increased the demands for the signaling capacity of a wireless system. Even more, some of the short messages themselves are becoming part of the signaling because Data-over-Signaling techniques are often used to speed up delivery for short messages because this relieves the system from having to set up formal connections for delivering the short messages. Therefore, improving the MME's signaling performance and signaling capacity is more and more useful for the entire LTE or E-UTRAN based wireless system.

Referring back to FIGS. 2 and 3, as noted above, at step S2000 the MME 142 defines an FSS MBSFN area for tracking area TA1 using cells inside and outside (e.g., at the boundary) the tracking area TA1. At step S2001, the MCE module 122 notifies and passes FSS configuration information such as a MCH Sub-frame Allocation Pattern (MSAP) to the eNodeBs 1105 that constitute the FSS MBSFN area.

At step S2002, eNodeBs 1105 within the FSS MBSFN area register for the FSS multicast transmissions, in response to the FSS configuration information from the MME 142 such that the eNodeBs 1105 receive the FSS content for all the UEs served by the eNodeBs 1105 as an IP Multicast transmission by the MME 142. In this example embodiment, the IP multicast transmission is assumed to be transmitted directly from the MME 142. But, it is also possible for the MME 142 to pass the FSS content to other network elements such as the S-GW (not shown) for multicasting.

Figure 5:
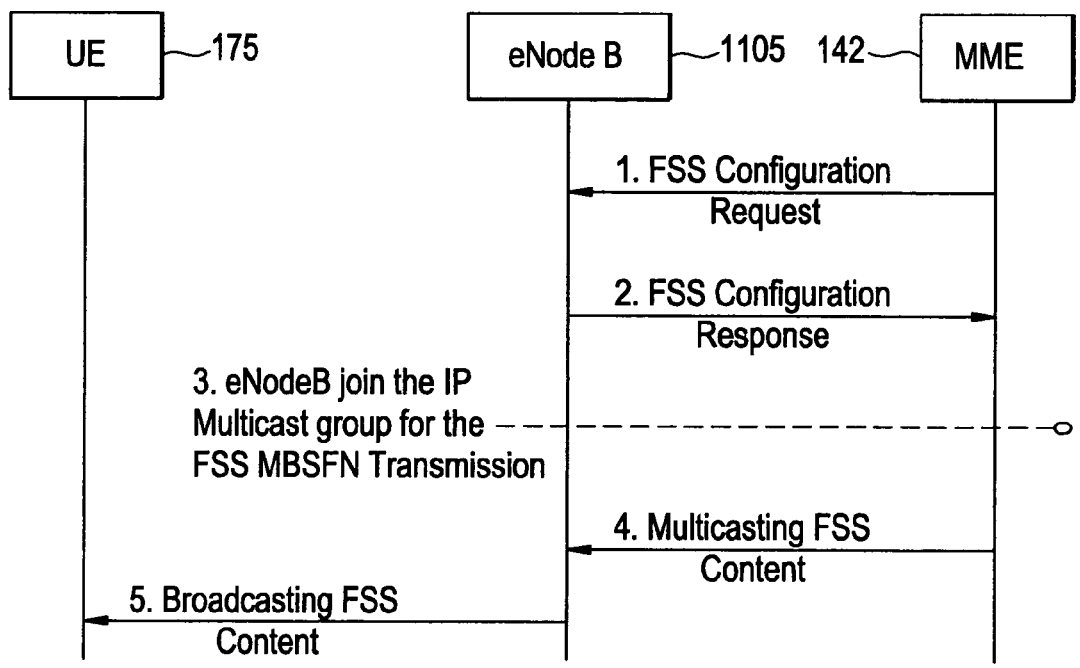
FIG. 5 is a signal flow diagram illustrating an example method for registering cells to receive FSS content according to an example embodiment.

FIG. 5 is a signal flow diagram illustrating steps S2001 and S2002 in FIG. 3 in more detail. The process shown in FIG. 5 win also be described with regard to the FSS MBSFN shown in FIG. 2.

Referring to FIG. 5, at step 1, the MME 142 notifies and passes the FSS configuration information to the eNodeBs 1105 in the defined FSS MBSFN area by transmitting an FSS Configuration Request message to the eNodeBs 1105. The FSS Configuration Request message is either the MBMS Session Start Request message or derived from this conventional message. The message includes FSS configuration information, which includes the IP multicast address (e.g., including port or other necessary information for multicasting) and session attributes. The session attributes include, for example, the FSS attributes such as the ID for identifying this FSS service. In addition to the above-described session attributes, the FSS Configuration Request message sent to the eNodeBs 1105 also includes radio bearer configuration for the FSS MBSFN transmission. Unlike the conventional MBMS, this FSS MBMS is actually a permanent MBMS embedded into the MME 142 in which FSS content is transmitted periodically whenever there are signaling messages to be delivered to UEs registered in the FSS MBSFN area.

Still referring to FIG. 5, at step 2 the eNodeBs 1105 confirm reception of the FSS Configuration Request message by sending a FSS Configuration Response message back to the MME 142. The FSS Configuration Response message is the same as or derived from the conventional MBMS Session Start Response message.

At step 3, in order to receive FSS MBSFN transmissions, the eNodeBs 1105 joins or registers with the IP multicast group identified in the FSS Configuration Request message.

After registering, at step 4 the MME 142 packages signaling messages into at least one FSS packet and sends (via multicasting) the FSS packet(s) to all the registered eNodeBs in the FSS MBSFN area when there are signaling messages needed to be sent to a plurality of idle UEs assumed to be located in the FSS MBSFN area.

At step 5, the eNodeBs 1105 transmit the FSS content to the UEs 175 in the same manner as conventional multi-cell MBSFN transmissions, except that the multicell transmission takes place within each cell in the FSS MBSFN area (which includes cells in multiple tracking areas) and includes FSS content, which contains signaling messages rather than conventional MBMS content (e.g., voice, audio, video, etc.). Because this standard method for transmitting is well-known, only a relatively brief discussion with regard to FIG. 6 will be provided below.

Figure 6:
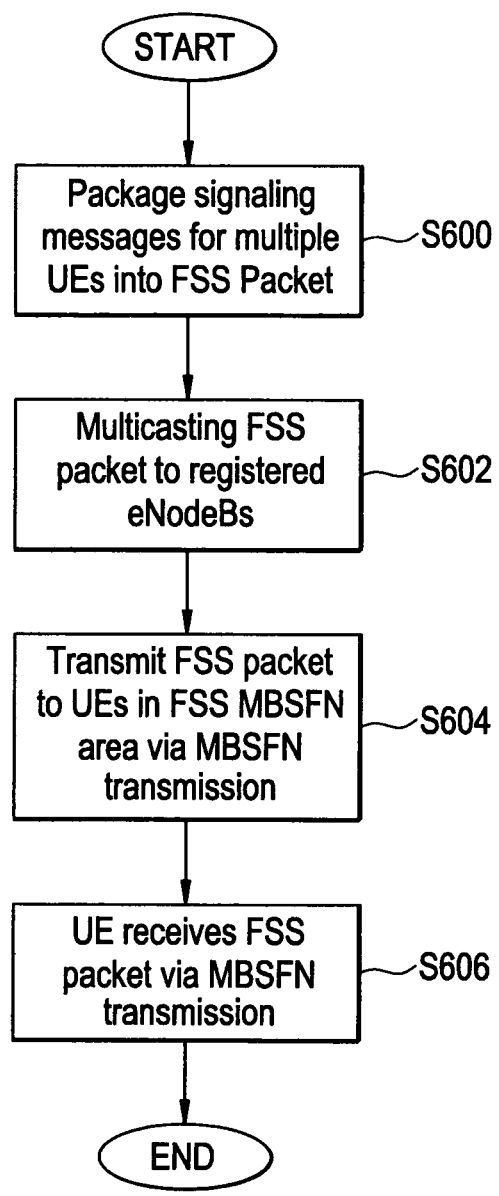
FIG. 6 is a flowchart illustrating a method for providing FSS content according to an example embodiment.

FIG. 6 is a flowchart illustrating a method for providing FSS content according to an example embodiment. The method shown in FIG. 6 will also be discussed with regard to the network shown in FIG. 2.

According to example embodiments, discontinuous reception (DRX) for each UE in an FSS MBSFN area is considered so that FSS content is only sent to destination UEs when the UEs wake up to receive the signaling messages. In one example, a UE may sleep for about 5 seconds (although normally, a UE uses, for example, the defaultPagingCycle included in the radioResourceConfigCommon specified by the system information message for SystemInformationBlockType2), before waking up for a brief period of time to monitor the Paging Radio Network Temporary Identity (P-RNTI) transmitted on Physical Downlink Control Channel (PDCCH) for Paging Occasion (PO) in the Radio Frame including a Paging Frame (PF). The UE need only monitor one P-RNTI per DRX cycle. This DRX cycle and the wake up time is known to both the network and the UE as it is derived from system's DRX parameters and UE's information such as its International Mobile Subscriber Identity (IMSI).

When a signaling message (such as a paging message for a connection request initiated by the network, e.g., a call intended for the UE) is to be delivered to the UE, the MME sends the signaling message to the UE (via the eNodeBs) when the MME knows the UE is about to wake up to receive signaling messages. When a plurality of UEs present in a single tracking area wake up at about the same time, which occurs frequently because all UEs are usually assigned to only one P-RNTI—which the standard defines as 0xFFFE in the conventional shared channel operation—the MME packages these messages together into an FSS packet and sends the packaged messages to the eNodeBs. The eNodeBs transmit the messages to UEs in the FSS MBSFN area in allocated transmission sub-frame(s) located within the time period in which the UE is awake.

Referring specifically to FIG. 6, at step S600 the eMBMS GW module 120 packs signaling messages (such as paging or other NAS signaling messages) intended for a plurality of UEs (e.g., only for UEs that would be in their wake up period when the pre-allocated sub-frames are scheduled to transmit the FSS packet, such that they are able to receive signaling messages on the MCH, in the FSS MBSFN area into an MBMS data packet.

Conventionally, a UE that wakes up and identifies a PO locates the PCH information and begins receiving packets on the identified incoming PCH (e.g., in the next radio frame). The UE parses through the received signaling messages (e.g., the paging messages for paged UEs in the PagingRecordList) contained in the packet to determine whether any of the signaling messages are addressed to itself. If none of the messages is intended for the UE, the UE goes back to sleep after processing the received packets. As will be described in more detail below, according to example embodiments, signaling messages are packaged in the same format. The payload in the FSS packet received a UE on the MCH is parsed by the same parser for determining whether the FSS packet includes signaling messages addressed to this UE. The payload is dropped if no signaling message is addressed to this UE.

According to example embodiments, the basic mechanism for receiving signaling messages from the radio access network (RAN) is the same for either using the conventional PCH or signaling message delivery methods according to example embodiments. But, the conventional PCH transmissions are not coordinated amongst the adjacent cells, such the data rate is lower due to the cell edge effect, interference and/or SNR. The MCH transmission according to example embodiments, on the other hand, is a synchronized or coordinated MBSFN transmission that reduces edge effects and/or suppresses interference. Therefore, methods according to example embodiments deliver signaling messages at a much higher data rate (e.g., about 16 times the rate due to the usage of higher coding rate and possibly higher level of modulations).

Returning to FIG. 6, at step S602, the packaged FSS packet (with signaling messages intended for UEs) is multicasted to the eNodeBs 1105 within the FSS MBSFN area by the MCE 122.

At step S604, the eNodeBs 1105 perform MBSFN transmissions to transmit FSS packet over the air interface to all UEs in the FSS MBSFN area on the MCCH and MTCH in the same manner as MBMS content is transmitted conventionally.

At step S606, UEs in their brief wake up period (e.g., about every 5 seconds), monitor the PDCCH for a Paging Occasion (PO), which is a sub-frame that may include P-RNTI addressing the paging message. Once a PO is identified, the UEs begin receiving FSS packets on the MCH. The UEs locate the MCCH and MTCH according to received system information from the BCCH, which directs the UE to a primary MCCH for receiving the transmitted signaling messages. The primary MCCH may point to additional secondary MCCH(s) on the MCH if multiple MSMB services (e.g., other than FSS) for overlapping FSS MBSFN areas exist for the cell. The UE may be programmed to look for the FSS for the tracking area TA1 by, for example, matching the tracking area ID for tracing area TA1 with a part of the FSS MBSFN service ID identifying a tracking area ID.

The UE processes the received MCCH to obtain scheduling information for the MTCH carrying the transmitted FSS packet. The UE then receives the transmitted FSS packet. The payload from the FSS packet is extracted and passed to a signaling message parser. If a signaling message (e.g., a paging or other NAS signaling message) is addressed to this UE, a corresponding reaction is triggered at the higher layer protocols (e.g., initiating connection by the higher layer in response to the paging). Because the processing of the MCCH and the MTCH is well-known, a detailed discussion is omitted.

The signaling message parser, which may be the same parser used for parsing the paging messages from the packet received from the conventional PCH, may be further enhanced or extended for extracting other messages such as non-paging NAS signaling messages and even more complicated signaling messages such as additional fields in the PagingRecordList or additional extended message classes for carrying SMS as Data-over-Signaling extension or Quality of Service (QoS) information with an added QoS Class Identifier (QCI) parameter for supporting more advanced features. In this way, small sized IM or SMS may be delivered to UEs more quickly and without the need to setup formal radio connections between the RAN and the UEs.

According to example embodiments, instead of sending a particular UE's signaling messages to all eNodeBs/cells in a MME area using a point-to-point mechanism, all eNodeBs/cells in the FSS MBSFN area covering the tracking area join an IP multicast group provisioned for the tracking area. In one example, cells and multicast IP addresses are provisioned statically or dynamically by an operations and management (OAM) network entity (not shown). The MME multicasts a particular UE's signaling messages, possibly bundled with signalling messages for other UEs, to the IP multicast group. As a result, all eNodeBs/cells in the IP multicast group are capable of receiving the bundled signalling messages (in a FSS packet) simultaneously or concurrently in a single multicast transmission.

Because signaling messages for a plurality of different UEs are bundled or packaged together into a single FSS packet for transmission from the MME to a plurality of eNodeBs in the FSS MBSFN area, and then from the eNodeBs to the UEs, system resources such as network bandwidth, processing power, etc. are conserved significantly.

Because the same FSS transmission is a MBSFN transmission in the FSS MBSFN area, which includes multiple cells, each UE may combine the signals transmitted by all cells from which the UE can receive transmitted signals. As a result, the UE will have much better reception due to the suppression of interference such that the signal to noise ratio increases. This allows the UE to receive the transmitted signaling messages at a much higher data rate (e.g., about 16 times the data rate may be achieved with higher coding rate and higher level of modulation) than the conventional mechanism for receiving signaling messages from control channels.

Due to the over-lapped or soft-boundary made up by the additional transmitting-only cells for each tracking area (e.g., overlapped FSS MBSFN coverage area near the boundary between the two adjacent tracking areas), a UE may remain registered with one FSS MBSFN area that covers a tracking area (the currently registered tracking area) when it is actually at the boundary or even after the UE enters slightly into an adjacent tracking area as it can still receive better FSS signals, assuming registration with FSS MBSFN area is utilized instead of registration with the tracking area.

A UE need only send the tracking are update (TAU) message when the UE moves relatively deep into the new FSS MBSFN area corresponding to a new tracking area. Once the UE is done updating, the UE maintains its newly registered FSS MBSFN area or tracking area because it is already well into this new FSS MBSFN area, the UE may remain registered with the new FSS MBSFN area even when the UE moves back to the boundary or slightly beyond. This suppresses and/or eliminates repeated TAU or 'ping-pong' effect.

In addition, because of the higher data rate used for the signaling, the physical layer data packet size increases for each sub-frame. For example, one radio frame of 10 ms is divided into 10 equal sub-frames and FSS transmissions are scheduled on a sub-frame basis. Therefore, more information for the signaling message may be added. For example, application-specific (e.g., category-based QoS) connection request notifications may be included in this signaling message so that the UE may activate the corresponding applications during connection setup. This improves response time for frequently used applications to enhance a users' experience with the LTE E-UTRAN based wireless system.

Higher data rate and increased physical layer data packet size for each sub-frame increases the signaling capacity for the entire system. This extra capacity may be used for carrying the extra burden introduced by, for example, instant messaging services, short messaging services, and the like.

The size of the tracking area often has an impact on the system's signaling performance. If the tracking area is too small, UEs may have to re-register very often due to their mobility and quick changing radio conditions. If the tracking area is too big, signaling messages to idle UEs may waste a system's air interface resources significantly in the conventional art. According to example embodiments, a larger tracking area may be supported due to its improved signaling capacity.

The impact of this higher data rate is advantageous in that more information may be sent to UEs due to the increased packet size. For example, more paging notifications for UEs may be packaged into a single FSS packet. The conventional methods are limited to maxPageRec=16 in number of UEs that can be notified in a single paging message or packet carried by the PCH. But, the FSS packet carried by the MCH may contain many more notifications for many more UEs. As a result, paging notifications to UEs may be sent as soon as the requests are received at the MME without delay.

Moreover, with simple extensions (e.g., adding additional information elements to the existing record or adding new messageClassExtension) to the PCCH-Message transmitted by the PCH, new messages/services such as Data-over-Signaling may be added and sent to the UEs. Accordingly, SMS messages may be sent to UEs without the need to set up formal connections.

Furthermore, additional data structures may be added to the PCCH-Message to speed up and/or facilitate a UEs' search for information addressed to them. For example, the UE-Identity and offset for point to the location of message addressed to the UE may be listed first, before the actual list of messages.

It is should be noted that, example embodiments have been described with respect to the standard MBMS functional unit such as the MBMS GW and MCE, but example embodiments may be used in connection with other radio network equipment or network entities. According to example embodiments, the MME packages the signaling information to be sent to UEs and multicasts the signaling information to eNodeBs, which then broadcast the signaling information in the tracking area so that idle UEs are able to receive their signaling information or small sized data (e.g., SMS, IM, etc.). Therefore, any means, methods or other mechanism capable of achieving part or all of these features may be used to implement the example embodiments discussed herein.

For example, another way of improving the air interface efficiency is to coordinate the allocation of the PCH from cells that comprise the tracking area and transmit the PCCH messages as an MBSFN transmission.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method of communicating signaling messages in a wireless network, the method comprising:
  receiving, at a plurality of eNodeBs in an area, a multicast packet from a mobility management entity via multicast transmission, the multicast packet including signaling messages collected and packaged into the multicast packet at the mobility management entity, and the signaling messages being intended for a plurality of UEs in the area; and
  transmitting, by the plurality of eNodeBs to a user equipment (UE) via a multicast channel, the multicast packet including the collected signaling messages; wherein
  the area is a tracking area of the wireless network,
  the multicast channel is configured to provide multimedia content to the plurality of UEs within the area,
  the signaling messages include at least paging information for locating the UE within the area, and
  the signaling messages are transmitted by the plurality of eNodeBs synchronously such that the UE interprets the synchronous transmissions from each of the plurality of eNodeBs equipments as a single transmission.

2. The method of claim 1, wherein the signaling messages further include Non-Access Stratum signaling messages.

3. The method of claim 1, wherein the signaling messages further include at least one of messaging data and quality of service (QoS) information intended for the UE.

4. The method of claim 1, further comprising:
collecting, at the mobility management entity, the signaling messages intended for the plurality of UEs in the area;
packaging the collected signaling messages into the multicast packet; and
multicasting the packet to each eNodeB in the tracking area.

5. The method of claim 4, further comprising:
defining, by the mobility management entity, a Multimedia Broadcast Frequency Network (MBSFN) area, the MBSFN area including the plurality of eNodeBs in the tracking area and at least one eNodeB at a boundary of the tracking area; and wherein
the multicasting step multicasts the multicast packet to each of the plurality of eNodeBs in the tracking area and the at least one eNodeB at the boundary via Internet Protocol (IP) multicast.

6. The method of claim 4, wherein the transmitting step further comprises:
transmitting, by the plurality of eNodeBs in the tracking area and the at least one eNodeB at the boundary, the multicast packet synchronously such that the UE interprets the synchronous transmissions from each of the plurality of eNodeBs as the single transmission.

7. The method of claim 4, wherein the multicast packet is transmitted as a Multimedia Broadcast Multicast Service (MBMS) transmission.

8. A method of communicating signaling messages in a wireless network, the method comprising:
receiving, at a user equipment (UE) from a plurality of eNodeBs in an area, a multicast packet via a multicast channel, the multicast packet including collected signaling messages intended for a plurality of UEs in the area, the area being a tracking area of the wireless network, and the multicast channel being configured to provide multimedia content to the plurality of UEs in the area, the signaling messages including at least paging information for locating the UE within the area; wherein
the UE receives the signaling messages from the plurality of eNodeBs synchronously such that the UE interprets the synchronous transmissions as a single transmission,
the plurality of eNodeBs in the area receive the multicast packet from a mobility management entity via multicast transmission, and
the signaling messages are collected and packaged into the multicast packet at the mobility management entity.

9. The method of claim 8, wherein the signaling messages further include Non-Access Stratum signaling messages.

10. The method of claim 8, wherein the signaling messages further include at least one of messaging data and quality of service (QoS) information intended for the UE.

11. The method of claim 8, wherein the multicast packet is a Multimedia Broadcast Multicast Service (MBMS) packet.

12. A method of communicating signaling messages in a wireless network, the method comprising:
collecting, at a mobility management entity, signaling messages intended for a plurality of UEs in a tracking area of the wireless network, the tracking area being an area of the wireless network including a plurality of eNodeBs and in which the plurality of UEs are located;
generating, at the mobility management entity, a multicast packet including the collected signaling messages;
first transmitting, from the mobility management entity to the plurality of eNodeBs in the tracking area via an Internet Protocol (IP) multicast transmission, the generated multicast packet for transmission to the plurality of UEs located in the tracking area; and
second transmitting the generated multicast packet from the plurality of eNodeBs in the tracking area to the plurality of UEs located in the tracking area via a multicast channel, the multicast channel being configured to provide multimedia content to the plurality of UEs within the area, the signaling messages including at least paging information for locating the UEs within the area; wherein
the signaling messages are transmitted by the plurality of eNodeBs synchronously such that the UEs interpret the synchronous transmissions as a single transmission.

13. The method of claim 12, wherein the second transmitting step comprises:
broadcasting the generated multicast packet from the plurality of eNodeBs to the plurality of UEs in the tracking area.

14. The method of claim 12, wherein the signaling messages includes Non-Access Stratum signaling messages.

15. The method of claim 12, wherein the generating step further comprising:
packaging the collected signaling messages into the multicast packet.

16. The method of claim 12, wherein the first transmitting step comprises:
multicasting the generated multicast packet to each of the plurality of eNodeBs in the tracking area.

17. The method of claim 16, further comprising:
defining, by the multimedia management entity Multimedia Broadcast Single Frequency Network (MBSFN) area, the MBSFN area including the plurality of eNodeBs in the tracking area and at least one eNodeB at a boundary of the tracking area; and wherein
the multicasting step multicasts the multicast packet to each of the plurality of eNodeBs in the tracking area and the at least one eNodeB at the boundary via Internet Protocol multicast.

18. The method of claim 12, wherein the multicast packet is a Multimedia Broadcast Multicast Service (MBMS) packet.

* * * * *